(12) United States Patent
Singh et al.

(10) Patent No.: US 10,160,115 B2
(45) Date of Patent: Dec. 25, 2018

(54) DYNAMIC BYTE ORDER DETERMINATION AND CONVERSION FOR ROBOTIC COMPONENT

(71) Applicant: Amazon Technologies, Inc., Seattle, WA (US)

(72) Inventors: Bijendra Singh, Cedar Park, TX (US); Chase Johnson, St Albans (GB); Lambertus Antonius Jacobus Cornelis Schouwenaars-Harms, Henley-on-Thames (GB); Paul White, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 15/384,176

(22) Filed: Dec. 19, 2016

(65) Prior Publication Data

US 2018/0169861 A1    Jun. 21, 2018

(51) Int. Cl.
| | | |
|---|---|---|
| *G06F 1/00* | (2006.01) | |
| *B25J 9/16* | (2006.01) | |
| *G06F 9/4401* | (2018.01) | |
| *G06F 13/38* | (2006.01) | |
| *G06F 13/40* | (2006.01) | |

(52) U.S. Cl.
CPC ........... *B25J 9/1643* (2013.01); *B25J 9/1658* (2013.01); *G06F 9/4411* (2013.01); *G06F 13/385* (2013.01); *G06F 13/4013* (2013.01); *G05B 2219/31403* (2013.01); *Y10S 901/02* (2013.01)

(58) Field of Classification Search
USPC ..................................... 710/65–70, 104–105
See application file for complete search history.

(56) References Cited

U.S. PATENT DOCUMENTS 6,141,716 A * 10/2000 Kwon ................. G06F 13/4013
                                                        710/311
6,535,957 B1 * 3/2003 Arimilli ............. G06F 9/30043
                                                        711/118
(Continued)

FOREIGN PATENT DOCUMENTS

WO    WO2006062948 A2    6/2006

OTHER PUBLICATIONS

PCT Search Report and Written Opinion dated Mar. 21, 2018 for PCT application No. PCT/US2017/065903, 11 pages.

*Primary Examiner* — Raymond N Phan
(74) *Attorney, Agent, or Firm* — Lee & Hayes, PLLC

(57) ABSTRACT

A management system (or controller) is configured to send commands to robotic components of different types (e.g., different command types, byte order types, etc.). Once configured, a translation component may be deployed to translate some commands to some robotic components that use a different command type than a native command type used by the management system. The management system uses a native byte order type to create commands, which may be big endian or little endian. While some of the robotic components (e.g., first robotic components) may also use the native byte order type, other robotic components (e.g., second robotic components) may use a non-native byte order type (in relation to the management system). For example, the native byte order type may be big endian while the non-native byte order type may be little endian, or vice versa.

20 Claims, 8 Drawing Sheets

(56) References Cited

U.S. PATENT DOCUMENTS

| | | | | |
|---|---|---|---|---|
| 6,725,369 | B1 * | 4/2004 | Farmer | G06F 7/768 |
| | | | | 710/65 |
| 6,874,063 | B1 * | 3/2005 | Arimilli | G06F 12/0831 |
| | | | | 711/118 |
| 7,200,841 | B2 * | 4/2007 | Lovett | G06F 8/4435 |
| | | | | 717/151 |
| 7,203,636 | B2 * | 4/2007 | Sandham | G06F 9/3017 |
| | | | | 703/20 |
| 7,334,066 | B2 * | 2/2008 | Lee | G06F 13/4013 |
| | | | | 710/30 |
| 7,404,019 | B2 * | 7/2008 | Moyer | G06F 13/4013 |
| | | | | 710/107 |
| 7,536,682 | B2 * | 5/2009 | Dankel | G06F 9/45516 |
| | | | | 712/209 |
| 7,640,553 | B2 * | 12/2009 | Zimmer | G06F 9/4484 |
| | | | | 719/321 |
| 7,870,316 | B1 * | 1/2011 | Peacock | G06F 13/4009 |
| | | | | 710/29 |
| 9,501,964 | B2 * | 11/2016 | Sakamaki | G06F 13/4013 |
| 2013/0268946 | A1 | 10/2013 | Langevin et al. | |
| 2014/0165151 | A1 | 6/2014 | Welday, Jr. et al. | |
| 2016/0154596 | A1 | 6/2016 | Willcock et al. | |

* cited by examiner

DYNAMIC BYTE ORDER DETERMINATION AND CONVERSION FOR ROBOTIC COMPONENT

BACKGROUND

Many fulfillment centers, manufacturing centers, and other large-scale processing facilities deploy robotics to assist humans in performing many different tasks. Many of these robotic components can be purchased off-the-shelf for use in various environments. However, not all robotic components are compatible with one another due to differences in control information, among other possible compatibility differences. This typically requires an entity to use a same type of robotic components, typically offered by a same vendor, to enable the entity to control the robotic components from a single management system (or controller). However, in some instances, entities may want to use robotic components from different vendors, such as to reduce overall costs by acquiring lower priced robotic components, based on availability of robotic components, based on functionality of robotic components, and/or based on other considerations. In order to use different types of robotic components, these entities may have to use different management systems to control the different types of robotic components, which may be costly and may present other challenges, such as synchronizing of actions between the different systems when robotic components are used together to perform time-dependent actions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
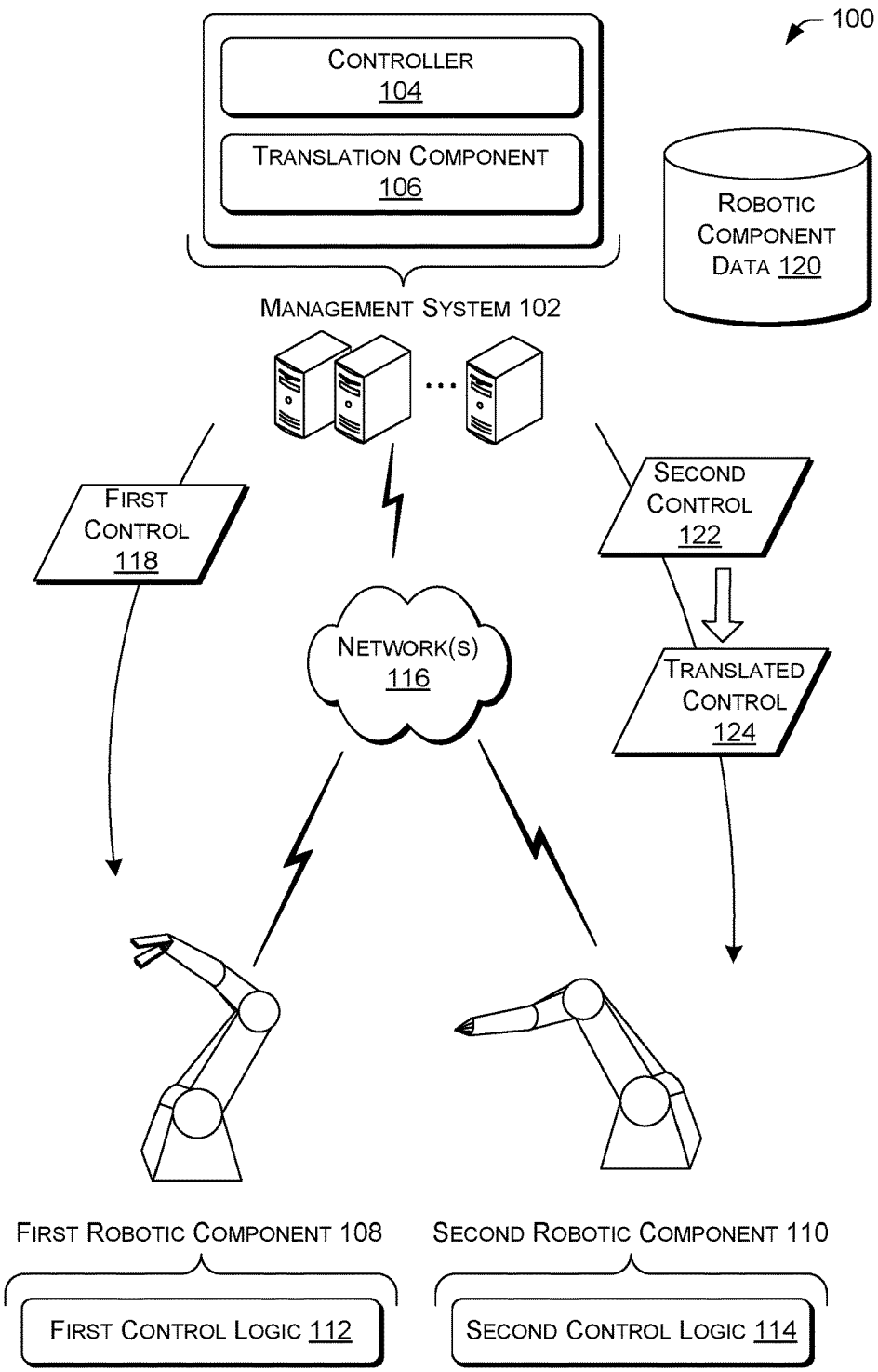
FIG. 1 is a schematic diagram of an illustrative environment that includes a common controller and byte order translator to control different robotic components having different byte order types.

This disclosure is directed to configuration of a management system (or controller) that uses robotic components of different types (e.g., different command types, byte order types, etc.). Once configured, a translation component may be deployed to translate some commands to some devices that use a different command type than a native command type used by the management system. The management system uses a native byte order type to create commands, which may be big endian or little endian. While some of the robotic components (e.g., first robotic components) may also use the native byte order type, other robotic components (e.g., second robotic components) may use a non-native byte order type (in relation to the management system). For example, the native byte order type may be big endian while the non-native byte order type may be little endian, or vice versa.

As discussed herein, the robotic components may include robotic devices, robotic workcells, and/or other discrete units of robotic components that exchange data with the management system using a specific communication type, such as a byte order type of big endian or little endian.

The configuration of the management system may occur on a one-by-one basis with each robotic component, such as after establishing a new network session with the robotic components or with individual robotic components. In some embodiments, during configuration, the management system may send a command to a specific robotic component. The robotic component may send a reply when the robotic component is able to process (or understand) the command, but may not send a reply when the robotic component is unable to process (or understand) the command. In the latter situation, the management system may experience a timeout due to unresponsiveness from the specific robotic component. For example, the command may be sent in a native command type that is native to the management system. If a timeout occurs, then the management system may determine that the robotic component uses a non-native command type.

The management system may then store a designation of a command type for the specific robotic component based on this result or query. The designation may be used or referenced when interacting with the robotic component during the session to ensure that commands are sent to the robotic component in a format/type understood by the robotic component. The designation may be stored as data and referenced from time to time to determine a command type for a particular robotic component. In some embodiments, the data may include a session identifier, a robotic component identifier (e.g., a manufacturer identifier, etc.), a universally unique identifier (UUID) (e.g. a device identifier, etc.), a media access control (MAC) address, or network address identifier, and a command type designator (e.g., big endian, little endian, etc.).

In various embodiments, at least some robotic components may be configured to respond to a command from the management system that is issued in a command type that is not native to the robotic component. The robotic component may then reply in a command type that is native to the robotic component. The management system may analyze the response to determine that the response is in a different command type than the command type of the issued command. The management system may then designate the robotic component accordingly so that the management system can issue subsequent commands in a command type that is native to the robotic component, which may require translation of the command type by a translation component.

The techniques and systems described herein may be implemented in a number of ways. Example implementations are provided below with reference to the following figures.

FIG. 1 is a schematic diagram of an illustrative environment 100 that includes a common controller and byte order translator to control different robotic components having different byte order types. The environment 100 may include a management system 102 that may include a controller 104 and a translation component 106. The controller 104 may generate commands to control a first robotic component 108 and a second robotic component 110. However, some commands may be translated prior to issuance to some robotic components to provide the commands to robotic components in a command type that is native to a byte order associated with individual robotic components.

The first robotic component 108 may include first control logic 112 that processes commands using a first command type (byte order). Meanwhile, the second robotic component 110 may include second control logic 114 that processes commands using a second, different command type (byte order). For example, the first control logic 112 may process commands natively using big endian while the second control logic 114 may process commands natively using little endian.

The management system 102 may exchange messages, such as commands, replies, and/or other messages with the robotic components via one or more networks 116. The network(s) 116 may be wired networks, wireless networks, or a combination of both. Different network sessions may be initiated by operation of the management system. A session may begin in response to a change in the components included in the environment (e.g., addition of a new robotic component, etc.), a change to the network settings, a software upgrade, a loss of power, and/or for other reasons. In an event of a new session, the management system 102 may perform a configuration process to determine a command type of robotic components, as discussed in more detail below.

In accordance with one or more embodiments, the controller 104 may generate a first control 118 in a native byte order type. The translation component 106 may reference robotic component data 120 that stores command types for the various robotic components. The robotic component data 120 may be stored in a database, in a text file, and/or using other types of data storage arrangements. The robotic component data 120 may be stored in hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic data. The translation component 106 may determine, via the robotic component data 120, that the first control logic 112 of the first robotic component 108 uses a same command type as the native byte order type, and that no translation is to be performed prior to sending the first control 118 to the first robotic component 108. Upon or after receipt of the first control 118, the first robotic component 108 may perform a movement or operation in accordance with the first control 118.

The controller 104 may generate a second control 122 in the native byte order type. The translation component 106 may again reference the robotic component data 120 that stores command types for the various robotic components. The translation component 106 may determine, via the robotic component data 120, that the second control logic 114 of the second robotic component 110 uses a different command type, such as a non-native byte order type, and that translation is to be performed prior to sending the second control 122 to the first robotic component 108. The translation component 106 may translate the second control 122 into a translated control 124 that is in a same command type as a native byte order type used by the second control logic 114 of the second robotic control component 110, which may be a non-native byte order type relative to the management system 102. Upon or after receipt of the translated control 124, the second robotic component 110 may perform a movement or operation in accordance with the translated control 124.

Figure 2:
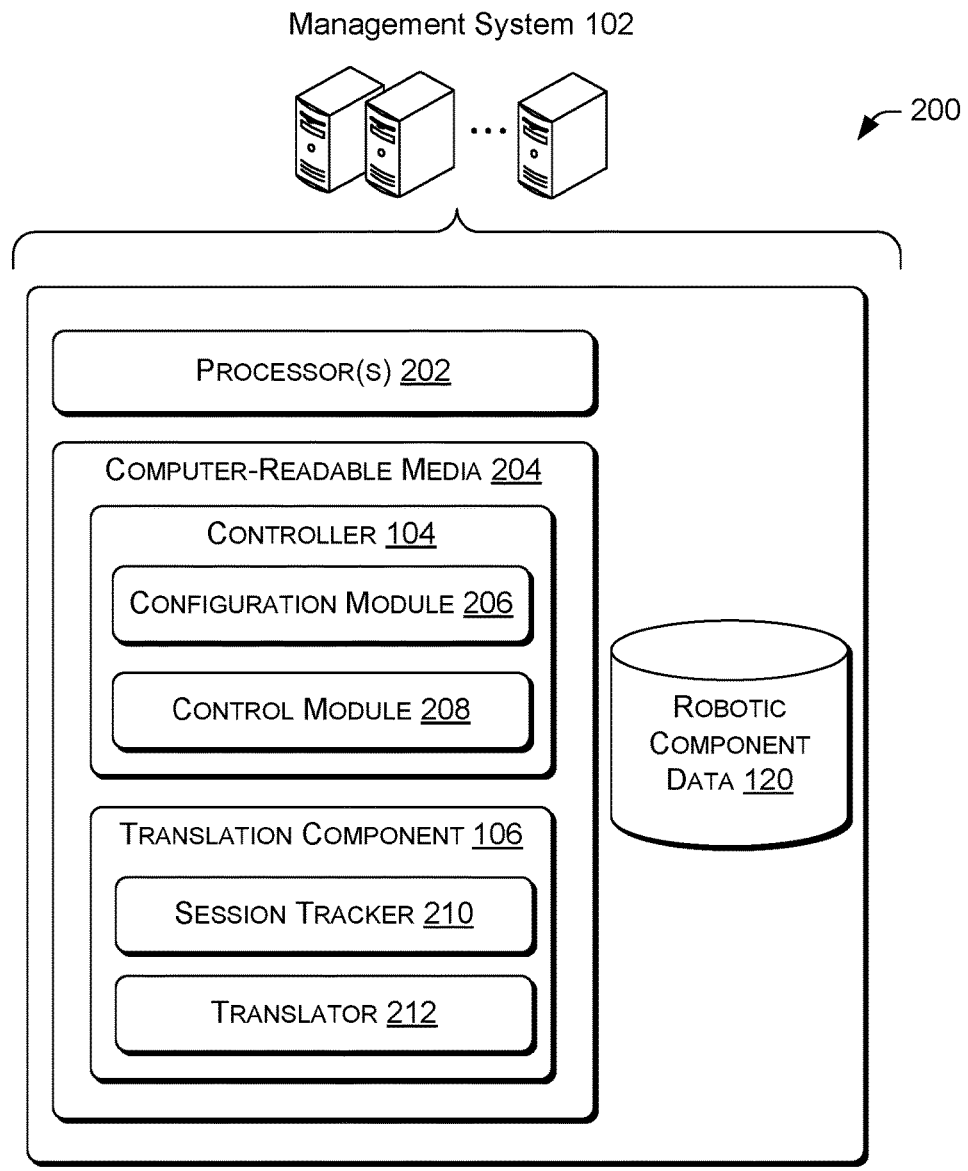
FIG. 2 is a block diagram of an illustrative computing architecture of the computing device shown in FIG. 1.

FIG. 2 is a block diagram of an illustrative computing architecture 200 of the computing device shown in FIG. 1. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the management system 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store the controller 104 and associated modules, and the translation component 106 and associated modules, which are described in turn. In some embodiments, the controller 104 may include a configuration module 206 and a control module 208 while the translation component 106 may include a session tracker 210 and a translator 212, which are each described in turn. The components and/or modules may be stored together or in a distributed arrangement. The computing architecture 200 may also include the robotic component data 120.

The configuration module 206 may determine commands to send to robotic components during configuration of the management system 102 with specific robotic components. The configuration module 206 may also analyze responses, or lack of responses before a timeout associated with a threshold amount of time, that happen in response to sending of a configuration command to a specific robotic component. For example, the configuration component 206 may perform at least a portion of the process shown in FIGS. 3-6.

The control module 208 may generate a command for a robotic component, such as the first control 118 and the second control 122 shown in FIG. 1. The control module 208 may generate commands in a native command type or byte order type. For example, if the management system 102 has a native byte order type of big endian, then the control module 208 may generate commands in big endian. However, if the management system 102 has a native byte order type of little endian, then the control module 208 may generate commands in little endian. Some commands may be translated before delivery to some robotic components, as discussed herein.

The session tracker 210 may interact with the robotic component data 120 to designate a command type of a specific robotic component, such as following a determination of the command type from the configuration module 206. However, the configuration module may write to the robotic component data 120 to make the designation. The session tracker 210 may access the robotic component data 120 to determine whether commands are to be translated to a different command type prior to transmission to a specific robotic component. In some embodiments, the robotic component data 120 may be populated with some information, such as default manufacturer information and/or device information, which may be used to determine a command type or byte order type for a specific device, such as for a UUID. In some embodiments, this data may be a starting point for a session and may be overwritten after configuration if configuration determines that a device uses a different command type.

The translator 212 may translate a command to a different command type in response to a determination, via the session tracker 210, that a robotic component operates using a different command type. The translator 212 may include or have access to processing power to enable timely translation of command types, such as from a big endian command to a little endian command or from a little endian command to a big endian command. After a command is translated into a proper command type for a specific component (or after determination that no translation is needed), the command may be transmitted to the robotic component.

In some embodiments, the configuration of the management system 102 for all or most of the robotic components may be performed as a batch process. However, in various embodiments, individual robotic components may be configured on an as-needed basis, such as just before the robotic component is to be used to take a specific action or perform a specific operation.

Figure 3:
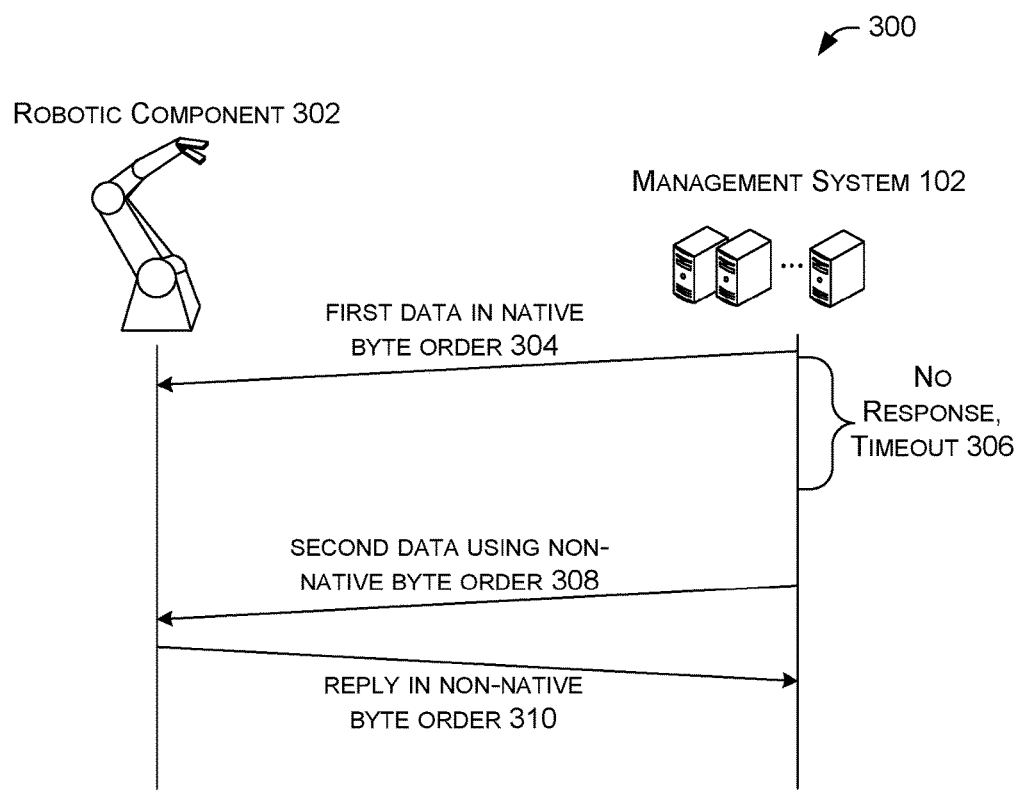
FIG. 3 is a data flow diagram of an illustrative data flow to determine a byte order of a robotic component based on response time.

FIG. 3 is a data flow diagram of an illustrative data flow 300 to determine a byte order of a robotic component based on response time. The data flow 300 shows data sent between the management system 102 and a robotic component 302 during a configuration process. Initially, the management system 102, via the configuration module 206, may send first data 304 to the robotic component using a native byte order that is native to the management system 102. However, the management system 102 may send the first data 304 in any byte order (native or non-native). Next, the management system 102 may wait to determine if the robotic component 302 provides a reply to the first data 304. The robotic component 302 may be unable to process or understand the first data, such as when the robotic component 304 uses a different command type or different byte order. When the robotic component is unable to understand or process the first data 304, then no reply may be sent to the management system 102 resulting in a timeout 306 when a reply is not received in a threshold amount of time from issuance or sending of the first data 304 by the management system 102.

When the timeout 306 occurs, the management system 102, via the configuration component 206, may determine that the robotic component 302 operates using a non-native command type or non-native byte order type that is different than the first data 304 previously provided to the robotic component 302. The session tracker 210 may store this designation in the robotic component data 120 for future reference when communicating with the robotic component 302 during the same session or possibly during a different session. The management system 102 may then send second data 308 using the non-native byte order or other byte order determined to be used for the robotic component 302. The robotic component 302 may transmit a reply 310 to the management system 102 using the non-native byte order or other byte order determined to be used for the robotic component 302.

FIGS. 4 and 6-8 are flow diagrams of illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
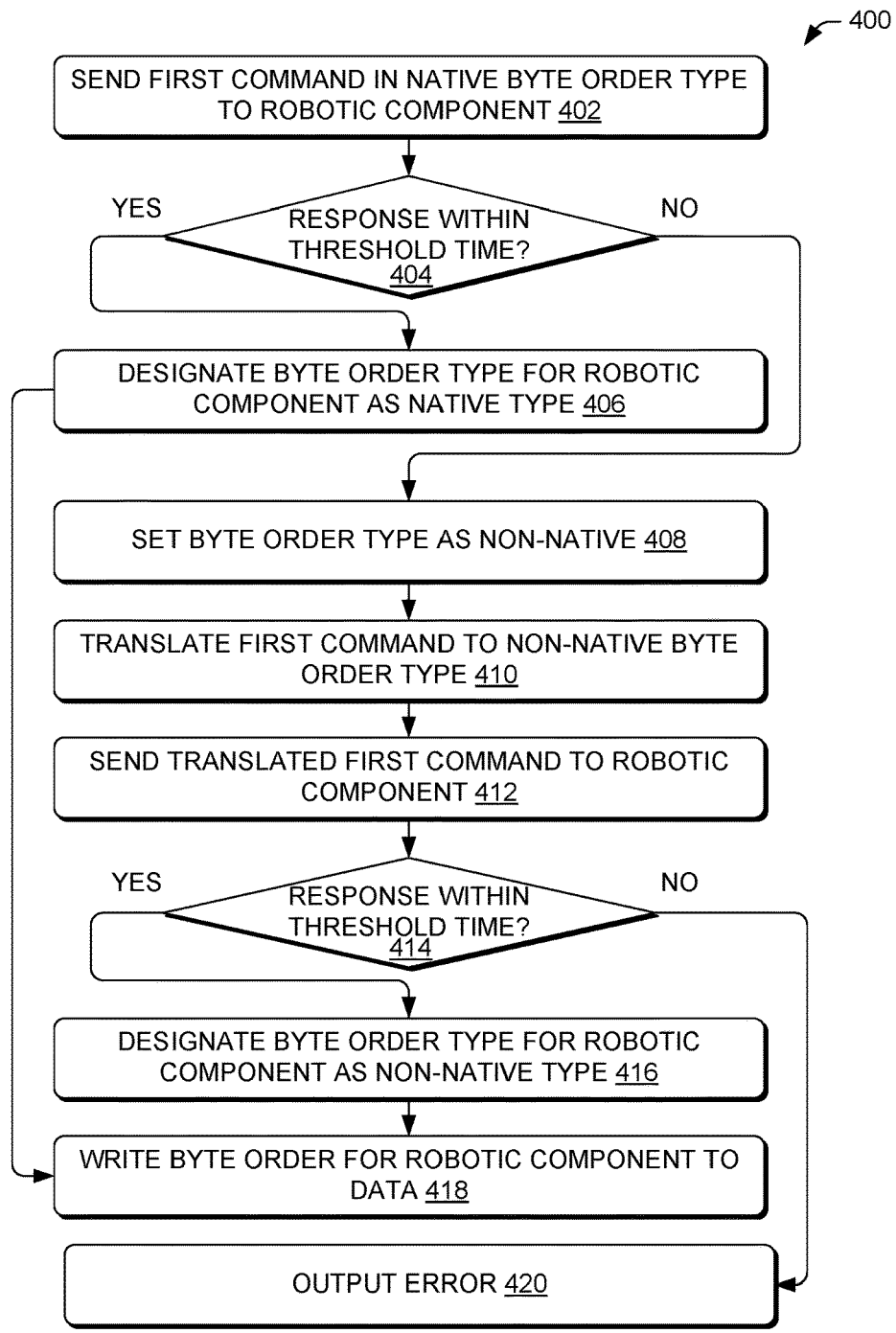
FIG. 4 is a flow diagram of an illustrative process to determine a byte order of a robotic component based on response time.

FIG. 4 is a flow diagram of an illustrative process 400 to determine a byte order of a robotic component based on response time. The process 400 is described with reference to the environment 100 and the computing architecture 200.

At 402, the configuration module 206 may send a first command to a robotic component. The first command may be in a native byte order type that is native to the management system 102. However, the byte order type may be sent in a different byte order type in some embodiments.

At 404, the configuration module 206 may determine whether the management system 102 receives a reply from the robotic component in response to the first command within a threshold amount of time associated with a timeout. When a reply is received within the threshold amount of time (following a "yes" route from the decision operation 404), then the process 400 may continue at an operation 406.

At 406, the configuration component 206 may designate the byte order type for the robotic component as the native type (or as the same type as used for the first command at the operation 402).

When a reply is not received within the threshold amount of time (following a "no" route from the decision operation 404), then the process 400 may continue at an operation 408. At 408, the configuration module 206 may set the byte order type as non-native or as a different type than the first command from the operation 402.

At 410, the translator 212 may translate the first command into a translated first command having the non-native byte order or as a different type than the first command from the operation 402.

At 412, the configuration module 206 may send the translated first command to a robotic component. The operation 412 may be used to ensure that the robotic component did not experience an error, such as when failing to reply to the first command 402. However, as noted below, this operation may be omitted in some embodiments.

At 414, the configuration module 206 may determine whether the management system 102 receives a reply from the robotic component in response to the translated first command within the threshold amount of time associated with the timeout. When a reply is received within the threshold amount of time (following a "yes" route from the decision operation 414), then the process 400 may continue at an operation 416.

At 416, the configuration component 206 may designate the byte order type for the robotic component as the non-native type (or as the same type as used for the translated first command at the operation 412).

Following the operation 406 or the operation 416, at 418, the configuration component 206 or the session tracker 210 may write or otherwise record the designation for the robotic component in the robotic component data 120, possibly along with other information about the robotic component, such as a network address, a robotic component identifier, a universally unique identifier (UUID), a media access control (MAC) address, a session identifier, a time, and/or other relevant information.

In some embodiments, a verification process of the byte order type performed using the operations 408-414 may be omitted from the process 400. Thus, the process 400 may be performed using operations 402-406, 416, and 418, where operation 416 follows the "no" route from the decision operation 404.

When a reply is not received within the threshold amount of time (following a "no" route from the decision operation 414), then the process 400 may continue at an operation 420. At 420, the configuration component 206 may report an error in the configuration of the robotic component.

Figure 5A:
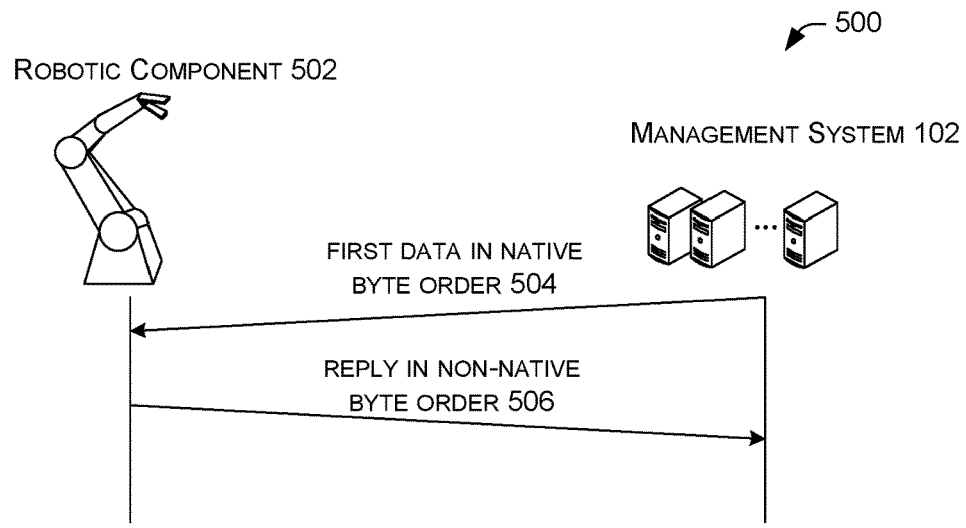
FIGS. 5A-5B are data flow diagrams of other illustrative data flows to determine a byte order of a robotic component based on a reply message.
Figure 5B:
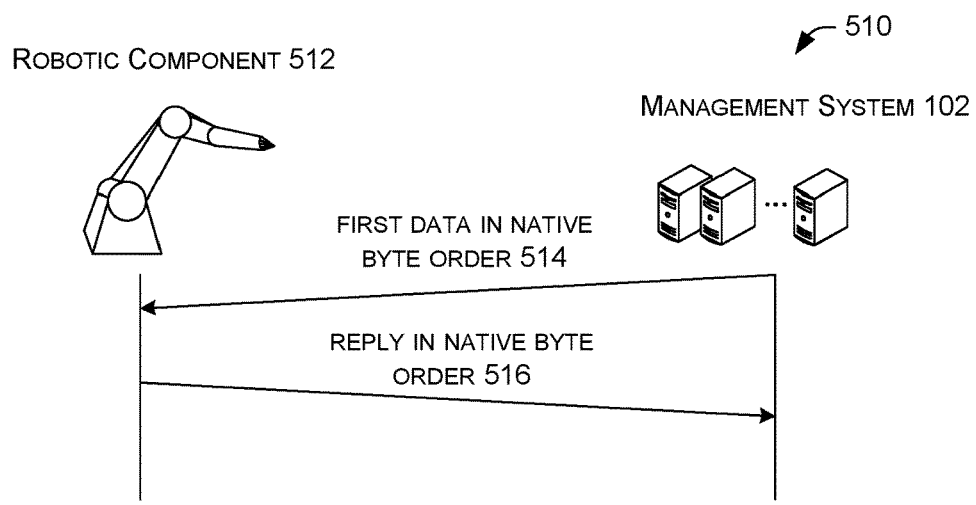

FIGS. 5A-5B are data flow diagrams of other illustrative data flows to determine a byte order of a robotic component based on a reply message. FIG. 5A shows a data flow 500 that shows data sent between the management system 102 and a robotic component 502 during a configuration process. Initially, the management system 102, via the configuration module 206, may send first data 504 to the robotic component 502 using a native byte order that is native to the management system 102. However, the management system 102 may send the first data 504 in any given byte order. Next, the robotic component 502 may transmit a reply 506 to the management system 102 using a non-native byte order or other byte order different than the byte order used for the first data 504. For example, the robotic component may process the first data 504 using onboard logic to translate the command or provide a reply in the non-native byte order 506.

The management system 102 may receive the reply 506 and then inspect or otherwise analyze the reply to determine if the reply 506 is in the native byte order or in a non-native byte order. For example, the management system 102 may inspect a four byte sequence (e.g., 0x00000102) and expect the four byte sequence to be a value (e.g., an unsigned integer, etc.) within a specific range (e.g., 1-512). However, in this situation, where the reply is in big endian but expected to be in little endian, for example, the value may be evaluated using little endian as 33619968, which is outside of the specific range. Using this result, the management system 102, via the configuration component 206 may determine that the robotic component 502 operates using a non-native command type or non-native byte order type that is different than the first data 504 previously provided to the robotic component 502. The session tracker 210 may store this designation in the robotic component data 120 for future reference when communicating with the robotic component 502 during the same session or possibly during a different session.

FIG. 5B shows a data flow 510 that shows data sent between the management system 102 and a robotic component 512 during a configuration process. Initially, the management system 102, via the configuration module 206, may send first data 514 to the robotic component 512 using a native byte order that is native to the management system 102. However, the management system 102 may send the first data 514 in any given byte order. Next, the robotic component 512 may transmit a reply 516 to the management system 102 using the native byte order or other byte order that is the same as the byte order used for the first data 514.

The management system 102 may receive the reply 516 and then inspect or otherwise analyze the reply to determine if the reply 516 is in the native byte order or in a non-native byte order. For example, the management system 102 may inspect a four byte sequence (e.g., 0x00000102) and expect the four byte sequence to be a value (e.g., an unsigned integer, etc.) within a specific range (e.g., 1-512). In this situation, where the reply is in big endian and expected to be in big endian, for example, the value may be evaluated using big endian as 258, which is inside of the specific range. Using this result, the management system 102, via the configuration component 206 may determine that the robotic component 512 operates using the native command type or native byte order type that is the same as the first data 514 previously provided to the robotic component 512. The session tracker 210 may store this designation in the robotic component data 120 for future reference when communicating with the robotic component 512 during the same session or possibly during a different session. Although use of a four byte unsigned integer is described above, any value may be generated from bytes of data, including a short (two bytes) or other sequence of bytes.

Figure 6:
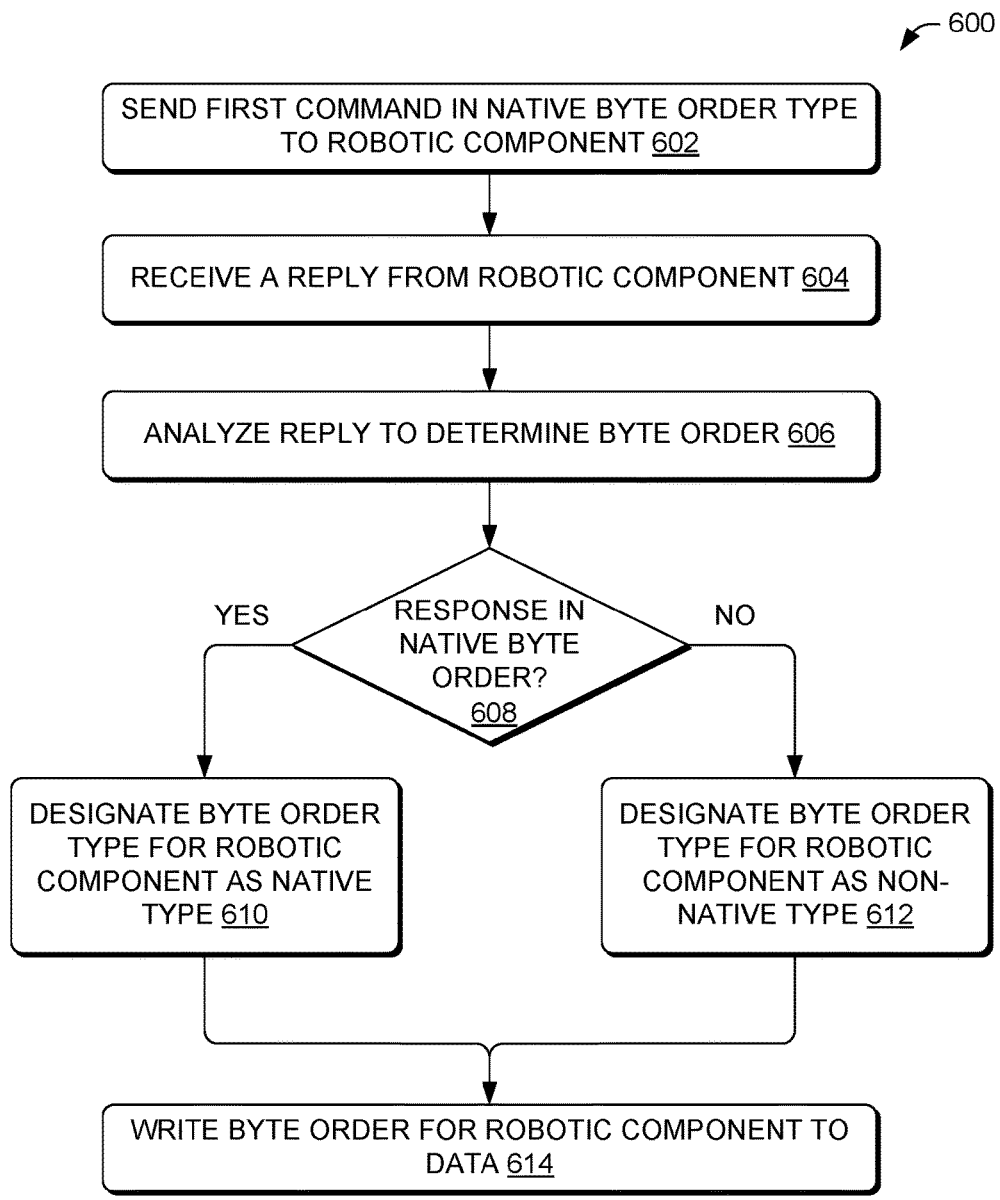
FIG. 6 is a flow diagram of an illustrative process to determine a byte order of a robotic component based on a reply message.

FIG. 6 is a flow diagram of an illustrative process 600 to determine a byte order of a robotic component based on a reply message. The process 600 is described with reference to the environment 100 and the computing architecture 200.

At 602, the configuration module 206 of the management system 102 may send a first command to a robotic component. The first command may be in a native byte order type that is native to the management system 102. However, the byte order type may be sent in a different byte order type in some embodiments.

At 604, the configuration module 206 may receive a reply from the robotic component. The reply may be received before a threshold amount of time associated with a timeout.

At 606, the configuration module 206 may analyze the reply to determine a byte order type for the reply. For example, the configuration module 206 may read or inspect a four byte sequence (e.g., 0x00000102) and expect the four byte sequence to be a value within a specific range (e.g., 1-512) when evaluated using a same byte order type as used for the first command in the operation 602.

At 608, the configuration module 206 may determine whether the reply is in a same byte order type as the first command sent at the operation 602. For example, the configuration module 206 may determine whether four byte sequence is within an expected range by interpreting the four byte sequence using a same byte order type as the first command sent at the operation 602. When the configuration module 206 determines that the reply is in a same byte order type (e.g., the native byte order type) as the first command sent at the operation 602, or that the four byte sequence is within the expected range (following a "yes" route from the decision operation 608), then the process 600 may continue at an operation 610.

At 610, the configuration component 206 may designate the byte order type for the robotic component as the native type (or as the same type as used for the first command at the operation 602).

When the configuration module 206 determines that the reply is in a different byte order type (e.g., a non-native byte order type) as the first command sent at the operation 602, or that the four byte sequence is outside of the expected range (following a "no" route from the decision operation 608), then the process 600 may continue at an operation 612. At 612, the configuration component 206 may designate the byte order type for the robotic component as the non-native type (or as a different type than used for the first command at the operation 602).

Following the operation 610 or the operation 612, at 614, the configuration component 206 or the session tracker 210 may write or otherwise record the designation for the robotic component in the robotic component data 120, possibly along with other information about the robotic component, such as a network address, a robotic component identifier, a UUID, a MAC address, a session identifier, a time, and/or other relevant information.

Figure 7:
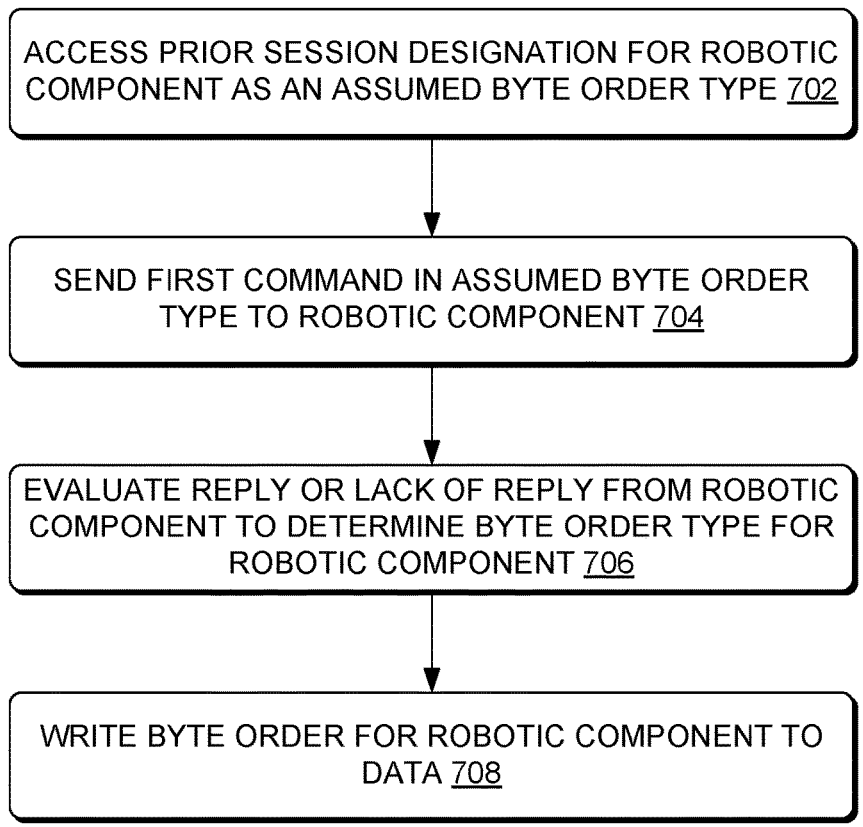
FIG. 7 is a flow diagram of an illustrative process to select a byte order type for a first command based on data from a prior session.

FIG. 7 is a flow diagram of an illustrative process 700 to select a byte order type for a first command based on data from a prior session. The process 700 then performs a configuration using this prior byte order as an initial guess. The process 700 is described with reference to the environment 100 and the computing architecture 200.

At 702, the session tracker 210 may access a prior session designation for a robotic component, via the robotic component data 120, to determine a byte order previously designated for the robotic component as an assumed byte order for a next session. For example, the session tracker 210 may access the prior value after detecting that a prior session has concluded, and that a new session has since begun. In some embodiments, the session tracker may access other data that may indicate a command type or byte order type for a device, such as manufacturer data that indicates a manufacturer of a device or a UUID that can be associated with a known command type or a known byte order type of the device.

At 704, the configuration module 206 may send a first command to a robotic component using the assumed byte order type determined at the operation 702. When an assumed value is not available, from the operation 702, the configuration module 206 may assume the byte order type is a native byte order type that is native to the management system 102. In some embodiments, when the assumed byte order type is not in the native byte order type of the management system 102, the translator 212 may translate the first command into the assumed byte order type, such as a non-native byte order type prior to sending the first command to the robotic component.

At 706, the configuration component 206 may evaluate a reply via the process 600 described with reference to FIG. 6 or may evaluate a lack of a reply via the process 400 described with reference to FIG. 4 to determine a byte order type for the robotic component.

At 708, the configuration component 206 or the session tracker 210 may write or otherwise record the designation for the robotic component in the robotic component data 120, possibly along with other information about the robotic component, such as a network address, a robotic component identifier, a UUID, a MAC address, a session identifier, a time, and/or other relevant information.

Figure 8:
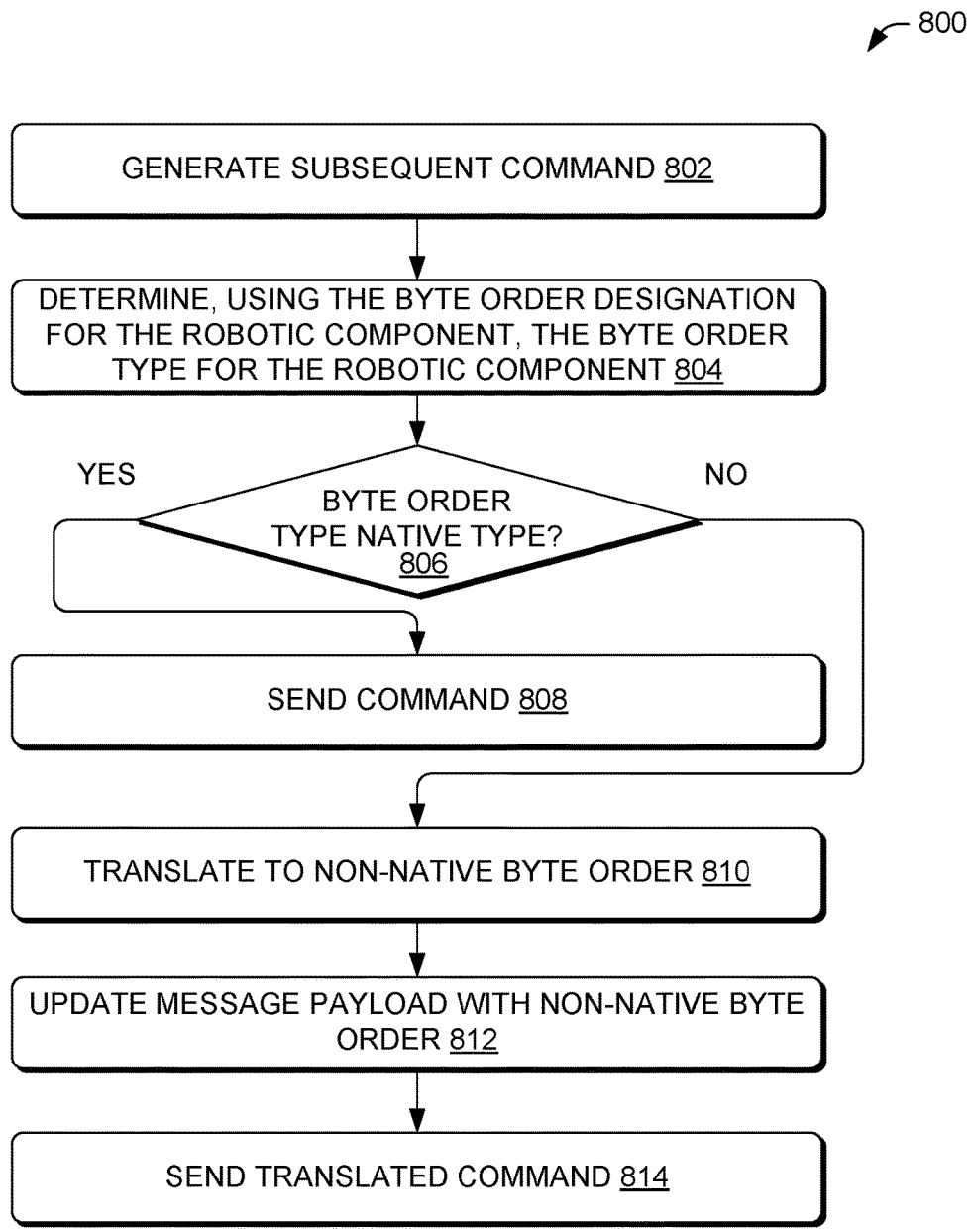
FIG. 8 is a flow diagram of an illustrative process to generate commands and selectively translate the commands for some robotic components.

FIG. 8 is a flow diagram of an illustrative process 800 to generate commands and selectively translate the commands for some robotic components. The process 800 may be performed after configuration performed using the process 400 (FIG. 4), the process 600 (FIG. 6), or the process 700 (FIG. 7), described above. The process 800 is described with reference to the environment 100 and the computing architecture 200.

At 802, the control module 208 may generate a command, such as a subsequent command or control to issue to a specific robotic component. The command may be to instruct a specific action at a certain time, for example.

At 804, the session tracker 210 may determine a byte order type for the specific robotic component using the robotic component data 120. The session tracker may perform a lookup operation before each command is sent to the specific robotic component, or when a designation is not readily available to the control module 208, such as when the designation is temporarily stored locally in cache, etc.

At 806, the control module 208 may determine whether the byte order type for the specific robotic component is in a native type (i.e., the same byte order type as the management system 102). When the byte order type for the specific robotic component is in the native type (i.e., the same byte order type as the management system 102) (following a "yes" route from the decision operation 806), then the process 800 may advance to an operation 808.

At 808, the control module 208 may send the command generated at the operation 802 to the specific robotic components. The control module 208 may bypass any translation since the byte order type of the command is already in a same byte order type as the byte order type determined for the specific robotic component.

When the byte order type for the specific robotic component is not in the native type (i.e., a different byte order type than the management system 102) (following a "no" route from the decision operation 806), then the process 800 may advance to an operation 810. At 810, the translator 212 may translate the command generated at the operation 802 into a translated command having the non-native byte order or as a different type than the command from the operation 802.

At 812, the translator 212 may update an application layer payload of a message to be transmitted to the specific robotic component to include the translated command in the non-native byte order type. However, translator 212 may not translate data in a transport layer of the message.

At 814, the control module 208 may send the translated command (or message) to the specific robotic component to cause the robotic component to perform an intended operation at an intended time. Since the translated command is in a same byte order type as the specific robotic component, the specific robotic component may process the command as if the specific robotic component was controlled by a system generating commands in a same byte order type as the specific robotic component.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
a robotic component having a byte order type;

a controller that operates in a native byte order type, the controller to:
  generate controls, in the native byte order type, for the robotic component;
  send a first control to the robotic component; and
  determine if a response to the first control is received from the robotic component within a threshold amount of time; and
a translation component to:
  store a designation for the robotic component based at least in part on whether the response was received from the robotic component within the threshold amount of time, the designation being a byte order type of little endian or big endian;
  receive a second control, in the native byte order type, for the robotic component;
  access the designation for the robotic component to determine the byte order type for the robotic component as little endian or big endian;
  translate the second control responsive to the native byte order type being different from the byte order type of the robotic component; and
  send the second control to the robotic component.

2. The system as recited in claim 1, wherein the translation component translates a big endian to a little endian or translates a little endian to a big endian.

3. The system as recited in claim 1, wherein the designation is stored in a database that includes byte order type designations for individual robotic components, the database further storing the byte order type designations with a session identifier and at least one of a robotic component identifier, a universally unique identifier (UUID), a network channel identifier, or a media access channel (MAC) address.

4. The system as recited in claim 1, wherein the second control includes a transport layer and an application layer payload, and wherein translation is performed on the application layer payload without translating the transport layer.

5. A system comprising:
one or more processors;
memory;
a controller, having a native byte order type, stored in the memory and executable by the one or more processors to:
  generate controls, in the native byte order type, for a robotic component;
  send an initial control, in the native byte order type, for the robotic component; and
  determine if a reply is received from the robotic component within a threshold amount of time in response to the initial control; and
a translation component stored in the memory and executable by the one or more processors to:
  store a designation for the robotic component based at least in part on whether the reply was received from the robotic component within the threshold amount of time;
  translate a subsequent control into a non-native byte order type responsive to the designation indicating a byte order type of the robotic component different from the native byte order type; and
  send the subsequent control to the robotic component.

6. The system as recited in claim 5, wherein the translation component translates a big endian to a little endian or translates a little endian to a big endian.

7. The system as recited in claim 5, wherein the subsequent control includes a transport layer and an application layer payload, and wherein translation is performed on the application layer payload without translating the transport layer.

8. The system as recited in claim 5, wherein the designation is stored in a database that includes byte order type designations for individual robotic components.

9. The system as recited in claim 5, further comprising:
the robotic component having the byte order type; and
a different robotic component having a different byte order type.

10. The system as recited in claim 5, wherein the translation component is further to:
receive the subsequent control for the robotic component; and
access the designation for the robotic component to determine the byte order type for the robotic component.

11. The system as recited in claim 5, further comprising determining a type of the initial control using a prior designation from a prior session.

12. The system as recited in claim 5, further comprising determining whether the reply received from the robotic component is of a same byte order type as the initial control sent to the robotic component.

13. The system as recited in claim 5, further comprising:
evaluating the reply using a same byte order type as the initial control sent to the robotic component to determine a value; and
comparing the value to a specific predetermined range of integers to determine whether the reply received from the robotic component is the same byte order type as the initial control.

14. One or more computer-readable media storing computer-executable instructions that, when executed on one or more processors, performs acts comprising:
sending an initial control in a first byte order type for a robotic component;
determining if a reply is received from the robotic component within a threshold amount of time;
receiving a subsequent control in the first byte order type for the robotic component;
accessing a designation for the robotic component to determine a byte order type for the robotic component, the designation based at least in part on whether the reply is received from the robotic component within the threshold amount of time;
translating the control into a second byte order type if the first byte order type is different than the byte order type of the robotic component; and
sending the control to the robotic component.

15. The one or more computer-readable media as recited in claim 14, wherein the acts further comprise:
storing the designation for the robotic component based at least in part on whether the reply was received from the robotic component within the threshold amount of time.

16. The one or more computer-readable media as recited in claim 15, wherein the acts further comprise:
evaluating the reply using a same byte order type as the initial control sent to the robotic component to determine a value; and
comparing the value to a specific predetermined range of integers to determine whether the reply received from the robotic component is the same byte order type as the initial control.

17. The one or more computer-readable media as recited in claim 14, wherein the designation includes little endian or big endian.

18. The one or more computer-readable media as recited in claim 14, wherein the translating includes translating a big endian to a little endian or translating a little endian to a big endian.

19. The one or more computer-readable media as recited in claim 14, wherein the control includes a transport layer and an application layer payload, and wherein translation is performed on the application layer payload without translating the transport layer.

20. The one or more computer-readable media as recited in claim 14, wherein the acts further comprise determining the designation using at least one of a manufacturer identifier or a universally unique identifier (UUID).

* * * * *